(12) United States Patent  
Arias

(10) Patent No.: US 6,606,906 B2
(45) Date of Patent: Aug. 19, 2003

(54) DIGITAL CONVERSION ADAPTER FOR MAGNETICALLY COUPLED LEVEL METERS

(75) Inventor: Herman Diaz Arias, Atizapan (MX)

(73) Assignee: TRN Business Trust, Dallas, TX (US)

(*) Notice: Subject to any disclaimer, the term of this patent is extended or adjusted under 35 U.S.C. 154(b) by 0 days.

(21) Appl. No.: 09/948,327

(22) Filed: Sep. 6, 2001

(65) Prior Publication Data

US 2003/0041665 A1 Mar. 6, 2003

(51) Int. Cl.$^7$ .......................... G01F 23/30; G01F 19/00
(52) U.S. Cl. .................... 73/308; 73/318; 73/1.73
(58) Field of Search .......................... 73/1.73, 293, 318, 73/314, 313, 308

(56) References Cited

U.S. PATENT DOCUMENTS

| | | | | |
|---|---|---|---|---|
| 1,963,330 A | * | 6/1934 | Lumme | 73/861.88 |
| 2,127,422 A | | 8/1938 | Phaneuf | 177/311 |
| 3,148,542 A | | 9/1964 | Clift, Jr. | 73/308 |
| 3,824,587 A | * | 7/1974 | Fowler | 340/347 P |
| 3,949,606 A | * | 4/1976 | Blancett | 73/229 |
| 4,051,726 A | | 10/1977 | Hastbacka | 73/290 |
| 4,065,968 A | * | 1/1978 | Sunagawa | 73/313 |
| 4,090,092 A | | 5/1978 | Serrano | 307/116 |
| 4,134,022 A | | 1/1979 | Jacobsen | 250/577 |
| 4,242,590 A | | 12/1980 | von Tlück | 250/577 |
| 4,290,059 A | | 9/1981 | Noyes et al. | 340/624 |
| 4,422,328 A | * | 12/1983 | Luchessa et al. | 73/313 |
| 4,427,132 A | | 1/1984 | Thomson | 222/23 |
| 4,598,742 A | | 7/1986 | Taylor | 141/95 |
| 4,638,305 A | | 1/1987 | Sutton | 340/620 |
| 4,688,028 A | * | 8/1987 | Conn | 340/625 |
| 4,706,203 A | | 11/1987 | Ramsdale et al. | 364/509 |
| 4,786,846 A | * | 11/1988 | Uchida | 318/482 |
| 4,859,987 A | | 8/1989 | Markus | 340/450 |
| 4,888,989 A | | 12/1989 | Homer | 73/304 |
| 4,912,976 A | | 4/1990 | Labriola, II | 73/290 |
| 4,950,998 A | | 8/1990 | Kramer et al. | 324/674 |
| 4,977,528 A | | 12/1990 | Norris | 364/571 |
| 4,983,855 A | * | 1/1991 | Grimes | 250/577 |
| 5,035,581 A | | 7/1991 | McGuire et al. | 417/36 |
| 5,042,299 A | | 8/1991 | Wells | 73/304 |
| 5,043,912 A | | 8/1991 | Reus | 364/509 |
| 5,105,085 A | | 4/1992 | McGuire et al. | 250/343 |
| 5,136,883 A | * | 8/1992 | Jannotta | 73/309 |
| 5,154,079 A | * | 10/1992 | Lupoli | 73/308 |
| 5,156,048 A | | 10/1992 | DeFigueiredo et al. | 73/308 |

(List continued on next page.)

FOREIGN PATENT DOCUMENTS

| GB | 2 147 697 A | 5/1985 |
|---|---|---|
| WO | WO 00/02015 | 1/2000 |

OTHER PUBLICATIONS

Notification of Transmittal of International Search Report mailed Sep. 19, 2001, corresponding to International Application No. PCT/US 01/40816 filed May 25, 2001.

Primary Examiner—Daniel S. Larkin
Assistant Examiner—K Wilson
(74) Attorney, Agent, or Firm—Baker Botts L.L.P.

(57) ABSTRACT

A digital conversion adapter for magnetically coupled level meters includes a first rotatable magnet located adjacent a second rotatable magnet of a level meter. The first rotatable magnet is operable to rotate in response to rotation of the second rotatable magnet. The second rotatable magnet is operable to rotate in response to changes of a liquid surface level. An encoded disc is mechanically coupled with the first rotatable magnet and operable to rotate in response to rotation of the first rotatable magnet. A light sensor array operable to monitor a position of the encoded disc, with respect to the light sensor array, by reading transmitted light which passes through the encoded disc, is also provided.

20 Claims, 4 Drawing Sheets

U.S. PATENT DOCUMENTS

| | | | |
|---|---|---|---|
| 5,251,482 A | | 10/1993 | Bates et al. .................... 73/290 |
| 5,265,032 A | * | 11/1993 | Patel .......................... 364/509 |
| 5,275,951 A | | 1/1994 | Chow et al. ................... 436/50 |
| 5,279,157 A | | 1/1994 | Mattis et al. ................. 73/290 |
| 5,297,423 A | | 3/1994 | Keating et al. ................ 73/49 |
| 5,309,212 A | | 5/1994 | Clark ............................ 356/5 |
| 5,351,036 A | | 9/1994 | Brown et al. ............... 340/618 |
| 5,351,548 A | | 10/1994 | Briggs et al. ................ 73/718 |
| 5,502,377 A | * | 3/1996 | Freund ....................... 324/175 |
| 5,535,625 A | | 7/1996 | Levy ........................... 73/290 |
| 5,609,059 A | | 3/1997 | McEwan ..................... 73/290 |
| 5,636,548 A | | 6/1997 | Dunn et al. .................. 73/313 |
| 5,642,097 A | * | 6/1997 | Martel ........................ 340/618 |
| 5,648,844 A | | 7/1997 | Clark ........................ 356/5.09 |
| 5,705,733 A | * | 1/1998 | Jannotta ...................... 73/1 H |
| 5,751,611 A | | 5/1998 | Jamieson .................... 364/573 |
| 5,755,136 A | | 5/1998 | Getman et al. ............... 73/290 |
| 5,842,374 A | | 12/1998 | Chang ......................... 73/290 |
| 5,880,480 A | | 3/1999 | Ellinger et al. ............. 250/577 |
| 5,895,848 A | | 4/1999 | Wilson et al. ................ 73/290 |
| 5,975,102 A | | 11/1999 | Schalk ......................... 137/2 |
| 6,052,190 A | | 4/2000 | Sckowski et al. ........... 356/376 |
| 6,239,709 B1 | | 5/2001 | Dykstra et al. ............. 340/618 |
| 6,272,911 B1 | | 8/2001 | Hinkle ........................ 73/118 |
| 6,336,362 B1 | * | 1/2002 | Duenas ........................ 73/313 |

* cited by examiner

DIGITAL CONVERSION ADAPTER FOR MAGNETICALLY COUPLED LEVEL METERS

TECHNICAL FIELD OF THE INVENTION

This invention relates to measurement devices, and more particularly to a digital conversion adapter for magnetically coupled level meters.

BACKGROUND OF THE INVENTION

Level sensing is used for a vast number of applications, perhaps the most familiar being for tanks containing liquids, such as fuel tanks. A limit level meter (also known as a switch level meter) provides readings at one or more predetermined levels. For example, a limit level meter may provide a reading only at a predetermined low level. A continuous level meter provides a continuous range of measurements from empty to full.

There are many different types of level meters, each type having a different principle of operation. Some of the more common types are float level meters, capacitive level meters, photoelectric level meters, and ultrasonic level meters.

Most level meters are designed to provide an analog readout at the meter. Therefore, a user must be physically present at a level meter in order to obtain and/or record a reading, at any given time.

SUMMARY OF THE INVENTION

In accordance with a particular embodiment of the present invention, a digital conversion adapter for a magnetically coupled level meter is provided. The adapter includes a first rotatable magnet located adjacent a second rotatable magnet of a level meter. The first rotatable magnet is operable to rotate in response to rotation of the second rotatable magnet. The second rotatable magnet may be operable to rotate in response to changes of a liquid surface level. An encoded disc is mechanically coupled with the first rotatable magnet and is operable to rotate in response to rotation of the first rotatable magnet. A light sensor array is operable to monitor a position of the encoded disc, with respect to the light sensor array, by reading a transmitter light, which passes through the encoded disc.

In accordance with another embodiment of the present invention, a light illuminator operable to direct source light through the encoded disc is provided. The light sensor array is operable to read a portion of the source light which passes through the encoded disc.

In accordance with yet another embodiment of the present invention, the light illuminator comprises a fiber guide. In this embodiment, the light sensor array may comprise a multiple fiber guide. A plurality of photodiodes operable to read the portion of the source light which passes through the encoded disc and the multiple fiber guide, may be provided at a remote location.

Technical advantages of particular embodiments of the present invention include a low cost adapter which is compatible with various types of float level meters. The adapter may be used in locations where electric or electronic devices are dangerous. The adapter may also be used in extreme temperatures.

Another technical advantage of particular embodiments of the present invention includes an adapter having high resolution and sensitivity, since there is nothing in physical contact with the rotating mechanism of the float level meter. Instead, only light comes in contact with the rotating mechanism. The adapter is suitable for use for automatic gas consumption charges to credit card systems.

Yet another technical advantage of particular embodiments of the present invention includes a digital conversion adapter which does not require calibration. The digital output is readily compatible with radio transmitters, and no analog-to-digital converter is required with the radio transmitter.

DETAILED DESCRIPTION OF THE INVENTION

Figure 1:
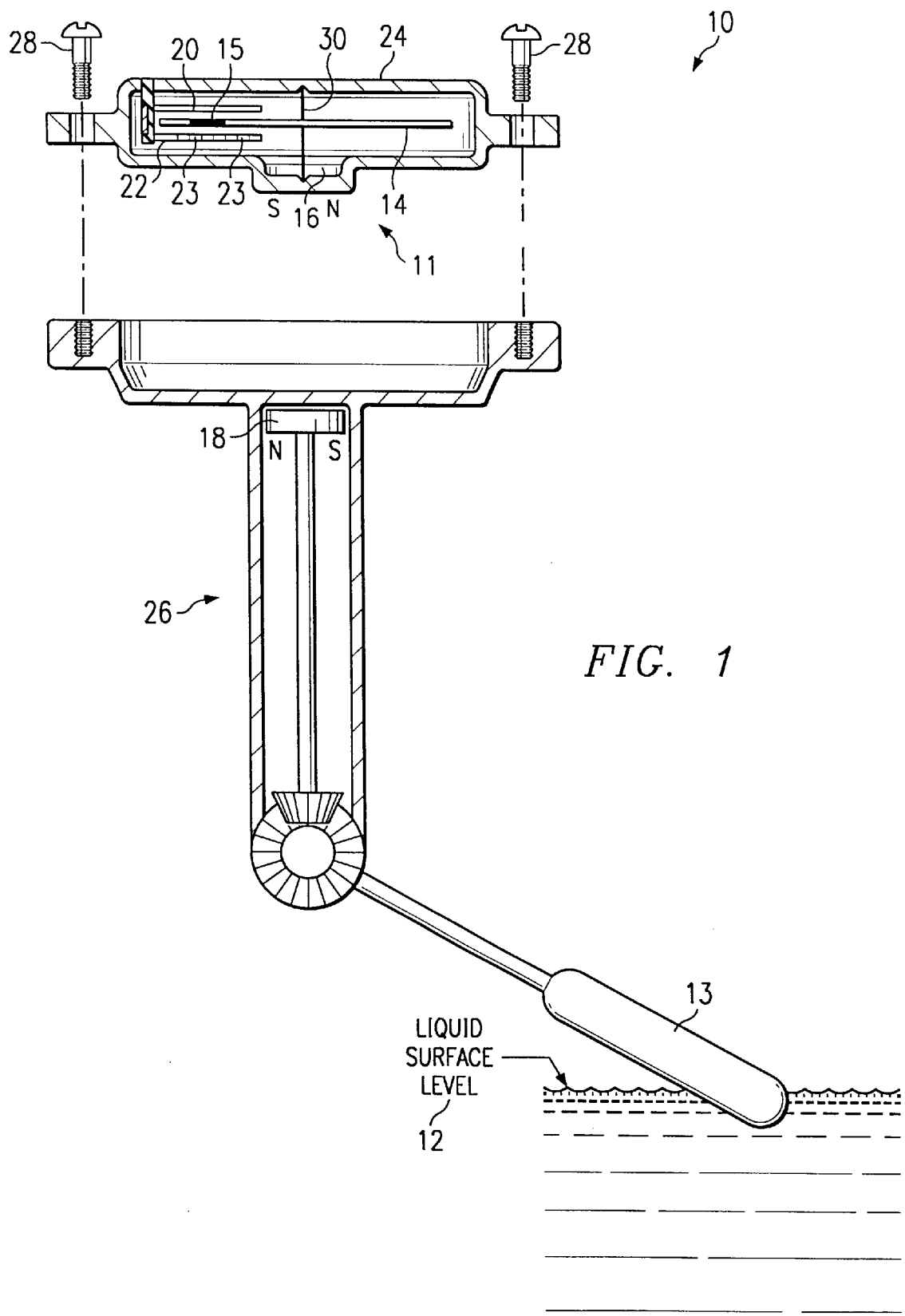
FIG. 1 illustrates a level meter having a digital conversion adapter, in accordance with a particular embodiment of the invention.

FIG. 1 illustrates a level meter 10 having a digital conversion adapter 11, in accordance with a particular embodiment of the invention. Level meter 10 may be installed in a storage container that contains liquid. For purposes of this description, it is assumed that the container is a tank. FIG. 1 indicates the liquid surface level 12 within the tank. The specific liquid surface level 12 in the tank at any given point in time is monitored using float 13 of level meter 10. Changes in the surface level may be monitored and/or recorded over time, by monitoring and/or recording the level and/or movement of float 13.

As explained below, the basic principle of operation of adapter 11 in the illustrated embodiment of FIG. 1, is the use of adapter 11 having an encoded disc 14 coupled with a magnet 16 that is inserted adjacent a magnet 18, typically associated with a conventional level meter. Magnet 16 and encoded disc 14 rotate in response to rotation of magnet 18. The position of encoded disc 14 is monitored using a light illuminator 20, and a light sensor array 22, to determine the liquid surface level 12, at any given time.

Float level meters are widely used to measure the liquid level in a container. In general, float level meters use a float to rotate a magnet coupled with the float. The rotation of the magnet is proportional to movement of the liquid surface level, and therefore, the level of the float in the container. A needle may be coupled with the magnet and used to monitor the position of the rotatable magnet. The position of the needle is calibrated against a reading dial in order for a user to determine the liquid surface level, by viewing the position of the needle with respect to the reading dial.

Many types of float level meters are limited to local reading of the liquid surface level in the container. In other words, a user must be physically present at the reading dial in order to determine the liquid surface level. In light of today's increasing data networking and communication capabilities, remote monitoring of tank levels and digital data processing of liquid surface level readings are desirable. The teachings of the present invention provide a system and method for digitally converting local surface level readings of a float level meter. The digital readings may be collected, stored or processed locally, and/or transmitted to a remote location to accomplish the same.

There are millions of float level meters in use today suitable for retrofit with an adapter for digital conversion, in accordance with aspects of the present invention. Such retrofit will provide substantial capabilities to industries which monitor and/or record liquid surface levels in containers. These capabilities include, without limitation, automated, remote monitoring and/or recordation of liquid surface levels over time, as well as the storage, communication, and/or manipulation of such data using computer and telecommunications networks.

Although level meter 10 is a float type meter in the example of this description, any level meter having a mechanism that activates a magnet in a similar manner as, magnet 18 could be used with adapter 11.

Level meter 10 has two main components: a reading dial 24 and a main body 26. It is assumed that reading dial 24 can be removed and replaced on the main body 26. This may be accomplished with screws 28 or various other attachment means.

The main body's float 13 floats on the surface of the liquid and moves up or down according to the liquid surface level 12 in the container. Rotatable magnet 18 has a mechanical coupling with float 13 that causes magnet 18 to rotate in response to movement of float 13. Magnet 16 and, therefore, encoded disc 14 move in response to the motion of magnet 18. In the example of this description, the rotation of magnets 18 and encoded disc 14 are in a plane parallel to the liquid surface, but other configurations are possible. For example, the reading dial 24 could be oriented at right angles to the surface, with magnets 16, 18 and/or encoded disc 14 repositioned accordingly.

Rotatable magnet 16 of adapter 11 is located adjacent, and therefore, magnetically coupled with rotatable magnet 18 of level meter 10. Each magnet 16 and 18 includes opposing N and S poles sufficiently aligned to produce a net magnetic field outside magnets 16 and 18, respectively. The orientation of N and S poles of magnet 16 are oriented opposite the orientation of N and S poles of magnet 18, in the illustrated embodiment. Therefore, as magnet 18 rotates, its magnetic field causes magnet 16 to rotate proportionally, in response.

Encoded disc 14 is coupled with magnet 16 using a central pin 30, which extends through mid-sections of encoded disc 14 and rotatable magnet 16, respectively. Central pin 30 is coupled with reading dial 24 at two locations, such that central pin 30 may rotate freely with respect to reading dial 24. Accordingly, rotation of magnet 16 translates to central pin 30 and causes rotation of encoded disc 14.

The position of encoded disc 14 is monitored by a light illuminator 20 and a light sensor array 22 associated therewith. The reading obtained by optical light sensor array 22 is digitally encoded due to a plurality of void spaces 15 (FIG. 2) encoded on encoded disc 14. Void spaces 15 are configured to provide the proportional relationship between the angle of rotation of encoded disc 14, with respect to light sensor array 22 and, therefore, the liquid surface level 12 of the container.

Figure 2:
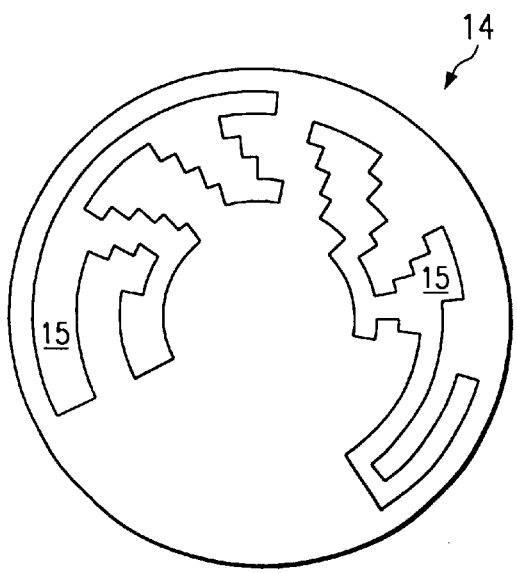
FIG. 2 illustrates an encoded disc of the adapter of FIG. 1.

FIG. 2 illustrates encoded disc 14 in more detail. Encoded disc 14 includes void spaces 15, which represent a modified Gray code. In the illustrated embodiment, the Gray code void spaces 15 are calculated to provide a disc with only 2 void spaces 15, or "lakes," and no "island." Due in part to this configuration, encoded disc 14 may be manufactured (e.g. die stamped) from a sheet of light opaque material.

Void spaces 15 are also calculated to provide encoded disc 14 with mechanical balance, to accommodate balanced rotation of encoded disc 14.

Gray code is a modified binary code in which sequential numbers are represented by expressions that differ only in one bit, to minimize errors. Gray code may also be referred to as "reflective code." A typical Gray code is an ordering of $2^n$ binary numbers such that only one bit changes from one entry to the next. Gray codes are useful in mechanical encoders since a slight change in location only affects one bit.

The modified Gray code of the illustrated embodiment uses six bits to represent the amount of light which passes through encoded disc 14. Various other modified Gray codes are available for use within the teachings of the present invention. Each bit corresponds to one of the light sensors in the light sensor array 22.

Figure 3:
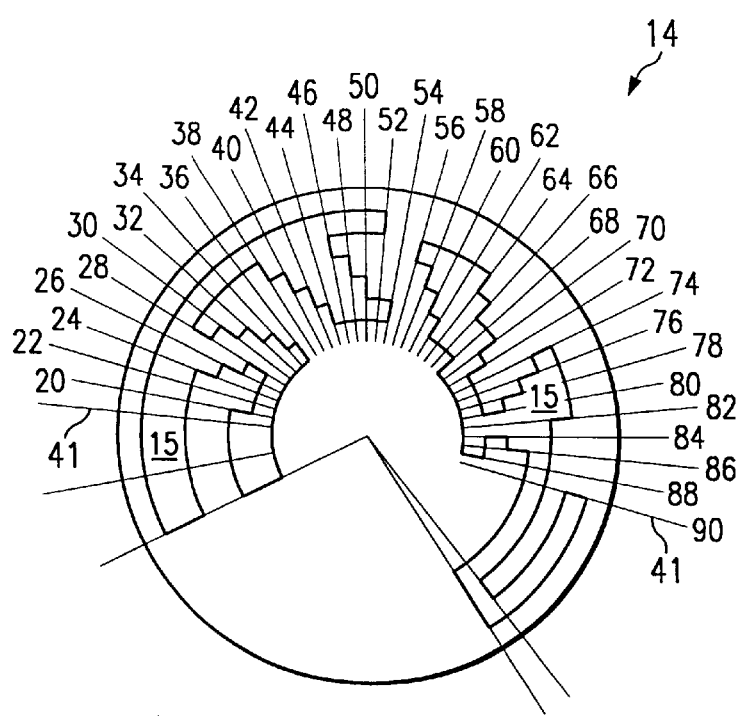
FIG. 3 illustrates the encoded disc of the adapter of FIG. 1, having two percent reading resolution.

FIG. 3 illustrates calibrated, encoded disc 14 in more detail. Encoded disc 14 of the illustrated embodiment includes calibration suitable for a gas tank level meter capable of two percent resolution reading. Warning levels 41 of liquid surface levels above 90% and below 20% of the tank capacity, are also provided.

Referring to FIGS. 1–3, the operation of adapter 11 will be described in more detail. Again, the position of encoded disc 14 corresponds to the liquid surface level 12. Light illuminator 20 and light sensor array 22 are used to determine the position of encoded disc 14, to within a two percent resolution which corresponds to two percent of the capacity of the tank.

Light illuminator 20 provides source light which is directed at encoded disc 14. The position of encoded disc 14 will determine how much light pass through void space 15. For example, each time the liquid surface level 12 changes enough to indicate a two percent change in the capacity of the tank, encoded disc 14 rotates and void space 15 will allow more or less light through encoded disc 14.

In the illustrated embodiment, light sensor array 22 includes six light sensors 23. Each light sensor 23 corresponds to one bit of data. If a particular light sensor 23 detects light, the bit of data is a "1." If a particular light sensor 23 does not detect light, the bit of data is a "0." As previously discussed, more or fewer light sensors 23 may be used to achieve greater or lesser resolution, respectively.

The conversion of the amount of light passing through encoded disc 14 to the position of encoded disc 14 (and therefore, the liquid surface level 12) is made by the use of the specific pattern void spaces 15 form in encoded disc 14. In other words, the pattern formed by void spaces 15 sets a relationship between the position of encoded disc 14, and the level inside the tank.

In the illustrated embodiment of FIG. 1, each light sensor 23 comprises a photodiode operable to detect the presence or absence of light. As will be described later in more detail, the photodiode may be located at a location remote to adapter 11. In this embodiment, fiber optic guides may be used to transmit the light which passes through encoded disc 14, to the location of the photodiodes.

Figure 4:
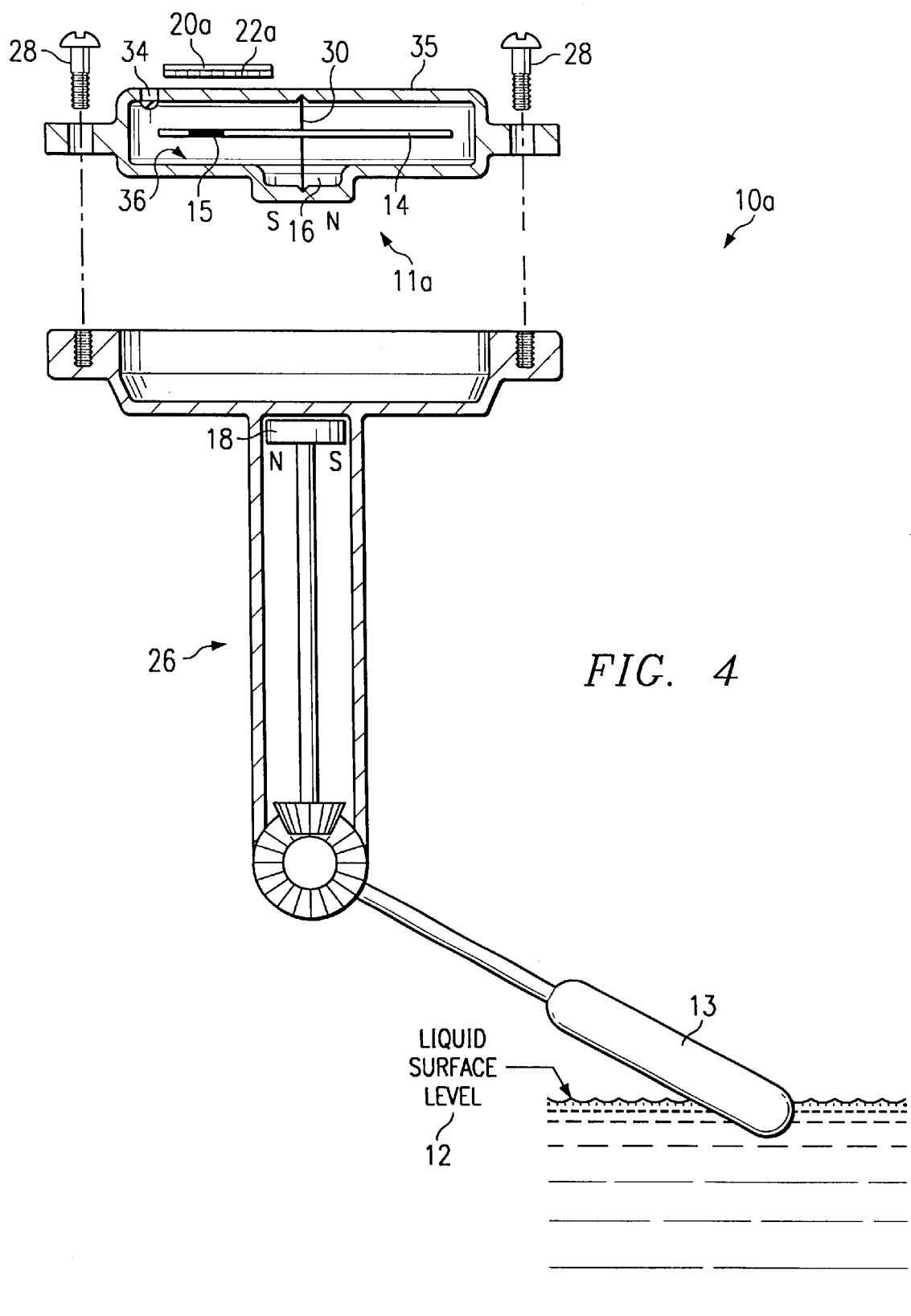
FIG. 4 illustrates a float level meter having an alternative embodiment adapter.

FIG. 4 illustrates level meter 10a in accordance with an alternative embodiment of the present invention. Level meter 10a includes float 13 operable to monitor changes in liquid surface level 12. Main body 26 includes rotatable magnet 18, which is mechanically coupled with float 13.

Retrofitting of existing level meters includes an adapter that can be incorporated into space and operating conditions offered by the level meters and ambient environment. Accordingly, configurations of adapter 11 and light illuminators 20/light sensor arrays 22. FIG. 3 illustrates one such alternative configuration.

Adapter 11a of FIG. 4 incorporates a reading arrangement which utilizes the light propagation properties of transparent plastics. Illumination is provided by a light source 34 through the top 35 of adapter 11a. The light is reflected by a reflective surface 36 (e.g. metallic bottom) of level meter 10a. Reflected light is read by light sensor array 22a associated with light illuminator 20a, after the reflected light passes through void spaces 15. For the purposes of this specification, the light which passes through encoded disc 14 may be referred to as transmitted light.

Various configurations are available for optical light sensor array 22, in accordance with different embodiments of the present invention. In the illustrated embodiment of FIG. 4, optical light sensor array 22 includes a six element reading array of photodiodes. However, more or fewer than six may be provided within the teachings of the present invention. For example, an array utilizing a seven element reading array of photodiodes may increase the resolution by up to one percent, without changing the original reading span. In order to accomplish this, an additional external track may be incorporated.

Figure 5:
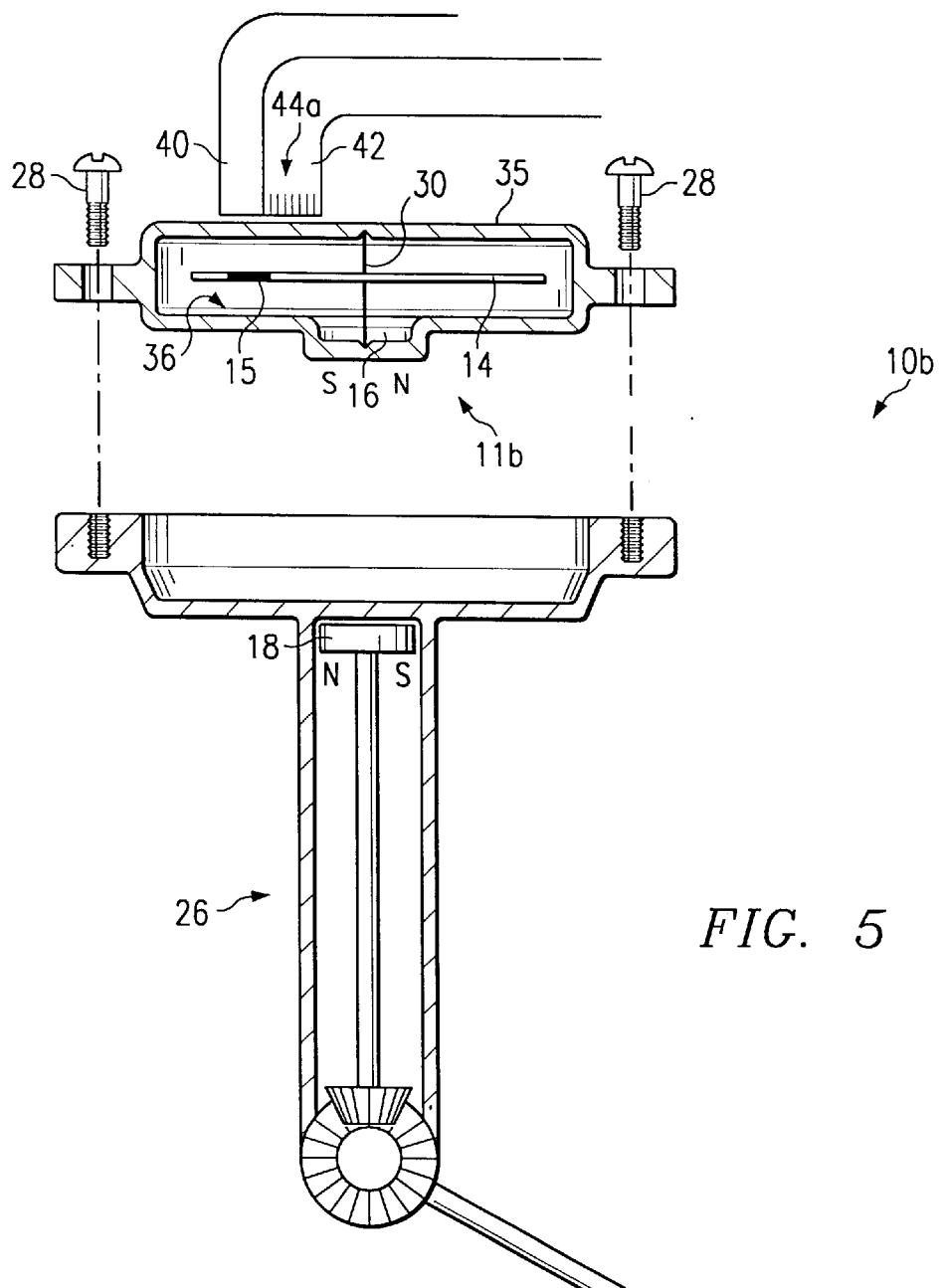
FIG. 5 illustrates a float level meter having an alternative embodiment adapter and fiber guides to provide and detect light through the encoded disc.

FIG. 5 illustrates a level meter 10b, in accordance with yet another embodiment of the present invention. Similar to level meter 10, level meter 10b includes main body 26, rotatable magnet 18 and float 13, operable to monitor changes in liquid surface level 12. Level meter 10b includes an adapter 11b which may be used in dangerous areas where the use of electricity must be avoided (e.g. explosive environment) and/or in environments where electronic equipment may fail (e.g. extreme temperatures).

Adapter 11b of FIG. 5 includes encoded disc 14. A fiber optic guide 40 is used to provide a light source to adapter 11b. Light is reflected from reflective surface 36, and passes through encoded disc 14. A multi-fiber guide 42 is utilized to provide a plurality of reading points 44a, which may be optically coupled with photodiodes. The photodiodes may be located at a remote location from adapter 11b. Accordingly, no electrical or electronic components are required in the vicinity of the level meter or container. Reading of light through reading points 44a may be accomplished remotely, using light and principles of fiber optics, instead of electric signals.

In a particular embodiment, light illuminator 20 and/or light sensor array 22 may be coupled with a power or light source. Light sensor array 22 and light sensors 23 may also be coupled with a processor or computer to collect, store, or process the information.

Light illuminator 20, light sensor array 22, and/or the processor or computer may also be coupled with a transmitter, computer network or telecommunications network, such that the data may be transmitted to a remote location. Transmission of the data may be accomplished by wireless means, or by means of cables or some other network medium.

The output of light sensor array 22 and/or sensors 33 is digital data that represents the level of the liquid contained in the tank or container. The liquid level data can be transmitted to a remote monitor to request refilling of the tank from a service provider or to otherwise inform a remote site of the level of the liquid within the tank. The transmission may use various intermediate devices; for example, the output signal may be used to operate an automatic telephone dialers. Various data communications systems may be used, such as by wire or radio frequency link.

Although the present invention has been described in detail, it should be understood that various changes, substitutions, and alterations can be made hereto without departing from the spirit and scope of the invention as defined by the appended claims.

What is claimed is:

1. A digital conversion adapter for a magnetically coupled level rev meter, comprising:

a first rotatable magnet located adjacent a second rotatable magnet of a level meter, the first rotatable magnet being operable to rotate in response to rotation of the second rotatable magnet, the second rotatable magnet being operable to rotate in response to changes of a liquid surface level;

an encoded disc being mechanically coupled with the first rotatable magnet and operable to rotate in response to rotation of the first rotatable magnet;

a light sensor array being operable to monitor a position of the encoded disc, with respect to the light sensor array, by reading transmitted light which passes through the encoded disc; and wherein the encoded disc includes a modified binary code having a two percent resolution.

2. The digital conversion adapter of claim 1, further comprising a light illuminator operable to provide source light which passes through the encoded disc.

3. The digital conversion adapter of claim 2, wherein the light illuminator is positioned adjacent a first side of the encoded disc and the light sensor array is positioned adjacent a second side of the encoded disc and wherein the light illuminator is operable to direct the source light perpendicular to the encoded disc, and the light sensor array is operable to detect the transmitted light transmitted through the encoded disc.

4. The digital conversion adapter of claim 1, further comprising:

an enclosed adapter body;

the encoded disc being installed within the adapter body;

the light illuminator and the light sensor array being positioned adjacent to and outside the adapter body; and wherein the light illuminator is operable to provide the source light which reflects from a reflective surface of the adapter body and passes through the encoded disc to form the transmitted light which is read by the light sensor array.

5. A digital conversion adapter for a magnetically coupled level meter, comprising:

a first rotatable magnet located adjacent a second rotatable magnet of a level meter, the first rotatable magnet being operable to rotate in response to rotation of the second rotatable magnet, the second rotatable magnet being operable to rotate in response to changes of a liquid surface level;

an encoded disc being mechanically coupled with the first rotatable magnet and operable to rotate in response to rotation of the first rotatable magnet;

a light sensor array being operable to monitor a position of the encoded disc, with respect to the light sensor array, by reading transmitted light which passes through the encoded disc;

further comprising a light illuminator operable to provide source light which passes through the encoded disc;

wherein the light illuminator is positioned adjacent a first side of the encoded disc and the light sensor array is positioned adjacent a second side of the encoded disc and wherein the light illuminator is operable to direct the source light perpendicular to the encoded disc, and the light sensor array is operable to detect the transmitted light transmitted through the encoded disc; and wherein the encoded disc is configured to form no more than two void spaces of a predetermined configuration to selectively allow portions of the source light to pass through the encoded disc, the portions of the source light comprising the transmitted light.

6. The digital conversion adapter of claim 5, wherein the predetermined configuration of the void spaces comprises a modified Gray code.

7. The digital conversion adapter of claim 5, wherein the void spaces are operable to digitally encode the portions of the source light such that the transmitted light provides a reading comprising a proportional relationship between rotation of the encoded disc and a configuration of the transmitted light.

8. The digital conversion adapter of claim 5, wherein the coded void spaces comprise a first and second void spaces formed in the encoded disc, the first and second void spaces cooperating to digitally encode the transmitted light to provide a reading proportional to the position of the encoded disc with respect to the light sensor array.

9. A digital conversion adapter for a magnetically coupled level meter, comprising:

a first rotatable magnet located adjacent a second rotatable magnet of a level meter, the first rotatable magnet being operable to rotate in response to rotation of the second rotatable magnet, the second rotatable magnet being operable to rotate in response to changes of a liquid surface level;

an encoded disc being mechanically coupled with the first rotatable magnet and operable to rotate in response to rotation of the first rotatable magnet;

a light sensor array being operable to monitor a position of the encoded disc, with respect to the light sensor array, by reading transmitted light which passes through the encoded disc; and wherein the encoded disc comprises a sheet of light opaque material which is die-stamped to form the void space.

10. A digital conversion adapter for a magnetically coupled level meter, comprising:

a first rotatable magnet located adjacent a second rotatable magnet of a level meter, the first rotatable magnet being operable to rotate in response to rotation of the second rotatable magnet, the second rotatable magnet being operable to rotate in response to changes of a liquid surface level;

an encoded disc being mechanically coupled with the first rotatable magnet and operable to rotate in response to rotation of the first rotatable magnet;

a light sensor array being operable to monitor a position of the encoded disc, with respect to the light sensor array, by reading transmitted light which passes through the encoded disc;

further comprising a light illuminator operable to provide source light which passes through the encoded disc;

wherein the light illuminator is positioned adjacent a first side of the encoded disc and the light sensor array is positioned adjacent a second side of the encoded disc and wherein the light illuminator is operable to direct the source light perpendicular to the encoded disc, and the light sensor array is operable to detect the transmitted light transmitted through the encoded disc;

wherein the encoded disc is configured to form at least one void space of a predetermined configuration to selectively allow portions of the source light to pass through the encoded disc, the portions of the source light comprising the transmitted light;

wherein the coded void space comprises a first void space, and further comprising a second void space formed in the encoded disc, the first and second void spaces cooperating to digitally encode the transmitted light to provide a reading proportional to the position of the encoded disc with respect to the light sensor array; and wherein the coded void space is configured to digitally encode the transmitted light to provide a reading comprising two percent resolution.

11. A digital conversion adapter for a magnetically coupled level meter, comprising:

a first rotatable magnet located adjacent a second rotatable magnet of a level meter, the first rotatable magnet being operable to rotate in response to rotation of the second rotatable magnet, the second rotatable magnet being operable to rotate in response to changes of a liquid surface level;

an encoded disc being mechanically coupled with the first rotatable magnet and operable to rotate in response to rotation of the first rotatable magnet;

a light sensor array being operable to monitor a position of the encoded disc, with respect to the light sensor array, by reading transmitted light which passes through the encoded disc; and wherein the coded void space is configured to provide a warning reading if the liquid level exceeds ninety percent of a container capacity.

12. A digital conversion adapter for a magnetically coupled level meter, comprising:

a first rotatable magnet located adjacent a second rotatable magnet of a level meter, the first rotatable magnet being operable to rotate in response to rotation of the second rotatable magnet, the second rotatable magnet being operable to rotate in response to changes of a liquid surface level;

an encoded disc being mechanically coupled with the first rotatable magnet and operable to rotate in response to rotation of the first rotatable magnet;

a light sensor array being operable to monitor a position of the encoded disc, with respect to the light sensor array, by reading transmitted light which passes through the encoded disc; and wherein the coded void space is configured to provide a warning if the liquid level drops below twenty percent of a container capacity.

13. A digital conversion adapter for a magnetically coupled level meter, comprising:

a first rotatable magnet located adjacent a second rotatable magnet of a level meter, the first rotatable magnet being operable to rotate in response to rotation of the second rotatable magnet, the second rotatable magnet being operable to rotate in response to changes of a liquid surface level;

an encoded disc being mechanically coupled with the first rotatable magnet and operable to rotate in response to rotation of the first rotatable magnet;

a light sensor array being operable to monitor a position of the encoded disc, with respect to the light sensor array, by reading transmitted light which passes through the encoded disc;

an enclosed adapter body;

the encoded disc being installed within the adapter body;

the light illuminator and the light sensor array being positioned adjacent to and outside the adapter body;

wherein the light illuminator is operable to provide the source light which reflects from a reflective surface of the adapter body and passes through the encoded disc to form the transmitted light which is read by the light sensor array; and wherein the light illuminator comprises a fiber guide and the light sensor array comprises a multiple fiber guide.

14. A digital conversion adapter for a magnetically coupled level meter, comprising:

a first rotatable magnet located adjacent a second rotatable magnet of a level meter, the first rotatable magnet being operable to rotate in response to rotation of the second rotatable magnet, the second rotatable magnet being operable to rotate in response to changes of a liquid surface level;

an encoded disc being mechanically coupled with the first rotatable magnet and operable to rotate in response to rotation of the first rotatable magnet;

a light sensor array being operable to monitor a position of the encoded disc, with respect to the light sensor array, by reading transmitted light which passes through the encoded disc;

an enclosed adapter body;

the encoded disc being installed within the adapter body;

the light illuminator and the light sensor array being positioned adjacent to and outside the adapter body;

wherein the light illuminator is operable to provide the source light which reflects from a reflective surface of the adapter body and passes through the encoded disc to form the transmitted light which is read by the light sensor array;

wherein the light illuminator comprises a fiber guide and the light sensor array comprises a multiple fiber guide; and further comprising a plurality of photodiodes coupled with the multiple fiber guide and operable to detect the presence or absence of light at a plurality of reading points associated with the multiple fiber guide.

15. A method comprising:

installing a first rotatable magnet adjacent to a second rotatable magnet of a level meter, the first rotatable magnet being operable to rotate in response to rotation of the second rotatable magnet, the second rotatable magnet being operable to rotate in response to changes of a liquid surface level;

mechanically coupling an encoded disc including a modified binary code having a two percent resolution and the first rotatable magnet such that the encoded disc is operable to rotate in response to changes of the liquid surface level;

directing source light through the encoded disc, the encoded disc being operable to selectively allow a portion of the light to pass through; and reading the portion of the light which passes through the encoded disc at a light sensor array to determine the liquid surface level.

16. The method of claim 15, further comprising digitally encoding the portion of the light which passes through encoded disc.

17. A method comprising:

installing a first rotatable magnet adjacent to a second rotatable magnet of a level meter, the first rotatable magnet being operable to rotate in response to rotation of the second rotatable magnet, the second rotatable magnet being operable to rotate in response to changes of a liquid surface level;

mechanically coupling an encoded disc and the first rotatable magnet such that the encoded disc is operable to rotate in response to changes of the liquid surface level;

directing source light through the encoded disc, the encoded disc being operable to selectively allow a portion of the light to pass through; and reading the portion of the light which passes through the encoded disc at a light sensor array to determine the liquid surface level; and wherein the source light is transmitted through a fiber guide and the light sensor array comprises a multiple fiber guide and further comprising reading the portion of the source light which passes through the encoded disc at a plurality of photodiodes associated with the multiple fiber guide.

18. The method of claim 16, further comprising transmitting the digitally encoded portion of the source light to a remote location.

19. A level meter for measuring the surface level of liquid in a container, comprising:

a float operable to rise and fall with the surface level;

a magnet coupled with the float, such that the magnet moves in response to movement of the float;

an encoded disc including a modified binary code providing two percent resolution coupled with the magnet and operable to rotate in response to the movement of the float;

a light illuminator operable to direct source light through the encoded disc; and a light sensor array operable to read a portion of the source light which passes through the encoded disc, to determine the surface level.

20. A level meter for measuring the surface level of liquid in a container, comprising:

a float operable to rise and fall with the surface level;

a magnet coupled with the float, such that the magnet moves in response to movement of the float;

an encoded disc coupled with the magnet and operable to rotate in response to the movement of the float;

a light illuminator operable to direct source light through the encoded disc; and a light sensor array operable to read a portion of the source light which passes through the encoded disc, to determine the surface level; and wherein the light sensor array comprises a multiple fiber guide and further comprising a plurality of photodiodes operable to read the portion of the source light which passes through the encoded disc, at a remote location.

* * * * *